(12) United States Patent
Lafont et al.

(10) Patent No.: US 8,480,025 B2
(45) Date of Patent: Jul. 9, 2013

(54) REAR PART OF AN AIRCRAFT INCLUDING AN ENGINE SUPPORT STRUCTURE ASSEMBLED SO AS TO OSCILLATE ON THE FUSELAGE

(75) Inventors: Laurent Lafont, Pechbusque (FR); Jean-Michel Saucray, Villeneuve les Bouloc (FR); Esteban Quiroz-Hernandez, Toulouse (FR); Jerome Antypas, Plaisance du Touch (FR); Mathieu Bonnet, Toulouse (FR); Frederic Journade, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 149 days.

(21) Appl. No.: 13/257,628

(22) PCT Filed: Mar. 29, 2010

(86) PCT No.: PCT/FR2010/050566
§ 371 (c)(1),
(2), (4) Date: Sep. 20, 2011

(87) PCT Pub. No.: WO2010/112742
PCT Pub. Date: Oct. 7, 2010

(65) Prior Publication Data
US 2012/0006937 A1    Jan. 12, 2012

(30) Foreign Application Priority Data

Mar. 30, 2009 (FR) .................................... 09 51959

(51) Int. Cl.
*B64D 27/00* (2006.01)

(52) U.S. Cl.
USPC ................................ 244/54; 244/55; 248/557

(58) Field of Classification Search
USPC .............. 244/54, 55, 119; 248/557, 554, 555, 248/552, 639; 60/39.31
See application file for complete search history.

(56) References Cited

U.S. PATENT DOCUMENTS

| 3,490,556 A | | 1/1970 | Bennett, Jr. et al. | |
| 4,492,353 A | * | 1/1985 | Phillips | 244/12.4 |
| 4,500,054 A | * | 2/1985 | Osborn | 244/54 |
| 4,821,980 A | * | 4/1989 | Clausen et al. | 244/54 |
| 5,065,959 A | * | 11/1991 | Bhatia et al. | 244/54 |
| 7,726,602 B2 | * | 6/2010 | Llamas Sandin | 244/54 |
| 2002/0190158 A1 | * | 12/2002 | Franchet et al. | 244/55 |
| 2009/0090811 A1 | * | 4/2009 | Llamas Sandin | 244/54 |

(Continued)

FOREIGN PATENT DOCUMENTS

| EP | 0 311 155 A2 | 4/1989 |
| EP | 0 429 100 A1 | 5/1991 |
| EP | 0 884 498 A2 | 12/1998 |
| WO | WO 2010/031958 A2 | 3/2010 |

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

A rear part of an aircraft including two connecting rods positioned symmetrically on either side of a median vertical plane, wherein each connecting rod has an end mounted on a support structure of the engines and another end mounted on the fuselage, wherein this part is configured to allow, by rotation of the connecting rods around their axes of rotation, an oscillating movement of limited amplitude of the assembly formed by the support structure and the engines, relative to the fuselage, through the first and second fuselage openings.

10 Claims, 8 Drawing Sheets

U.S. PATENT DOCUMENTS

| | | |
|---|---|---|
| 2010/0038472 A1* | 2/2010 | Cazals et al. .................... 244/54 |
| 2011/0168836 A1* | 7/2011 | Sanz Martinez et al. ....... 244/54 |
| 2011/0226893 A1* | 9/2011 | Lafont et al. .................... 244/54 |
| 2011/0226894 A1* | 9/2011 | Lafont et al. .................... 244/54 |
| 2011/0233326 A1* | 9/2011 | Lafont ............................. 244/54 |
| 2011/0309188 A1* | 12/2011 | Marche ........................... 244/54 |
| 2011/0309189 A1* | 12/2011 | Marche ........................... 244/54 |

\* cited by examiner

REAR PART OF AN AIRCRAFT INCLUDING AN ENGINE SUPPORT STRUCTURE ASSEMBLED SO AS TO OSCILLATE ON THE FUSELAGE

TECHNICAL FIELD

The present invention relates generally to a rear part of an aircraft, fitted with engines added on to its fuselage.

STATE OF THE PRIOR ART

To construct such a rear part of an aircraft, it has been proposed, in the prior art, to interpose an engine mounting structure between the fuselage and each engine. In this configuration the structure is attached directly to the fuselage. To transfer the engine efforts to the fuselage, the dimensions must be substantial, in terms of the structure itself, of the part of the fuselage supporting it, and of the fasteners interposed between these elements. This causes drag, adversely affecting the aircraft's overall aerodynamic performance.

Another solution consists in having an engine support structure traversing the fuselage, and the internal space of the aircraft defined by this fuselage. Where it passes through both fuselage openings the traversing structure is fishplated to the fuselage using many bolts or similar fastenings.

However, although this solution, compared with the solution described above, allows the intensity of the efforts introduced into the fuselage in the area of each of the two openings to be reduced slightly, particularly the efforts oriented in the direction of the support structure, the openings' frames are still subject to high local loads. This results in a need to over-dimension the assembly, particularly the openings' frames and the surrounding parts of the fuselage, to the detriment of the aircraft's overall mass.

In addition, this solution makes it difficult, from a vibratory standpoint, to isolate the fuselage relative to the vibrating assembly formed by the engines and the support structure. Thus, substantial vibrations are likely to be transmitted to the fuselage, with the risk that the environment will be made uncomfortable for the occupants of the aircraft.

OBJECT OF THE INVENTION

The purpose of the invention is therefore to provide a rear part of an aircraft at least partially providing a solution to the disadvantages mentioned above, compared with the embodiments of the prior art.

To accomplish this, the purpose of the invention is a rear part of an aircraft including:

- a fuselage defining an internal space of the aircraft;
- at least two engines;
- an engine support structure, traversing the said fuselage in the area of first and second openings made in the latter, and distributed either side of a vertical median plane (P) of the aircraft, where the said support structure has first and second opposite ends;
- each of the said first and second opposite ends of the support structure protruding externally from the fuselage, respectively either side of the said vertical median plane, and supporting one of the said engines; and
- fastening means connecting the said support structure to the fuselage.

According to the invention, the said fastening means include two effort transmission connecting rods positioned, as seen from a front view of the rear part of an aircraft, either side of the vertical median plane (P), and preferably symmetrically relative to this plane, where each connecting rod has a first end mounted on the said support structure in rotary fashion along an axis of rotation parallel to the longitudinal direction (X) of the aircraft, and a second end mounted on the fuselage, at some distance from the first and second openings, in a rotary fashion along an axis of rotation parallel to the longitudinal direction (X) of the aircraft. In addition, the said rear part of an aircraft is designed so as to allow, by rotation of the connecting rods around the said axes of rotation, an oscillating movement of limited amplitude of the assembly formed by the support structure and the said engines, relative to the said fuselage, through the said first and second openings of the latter.

Thus, the originality of the invention lies essentially in the fact of allowing free oscillation of the assembly formed by the support structure and the engines, relative to the fuselage, with limited amplitude. In flight, the vibrations of the assembly thus lead to such an oscillating movement, during which these vibrations are preferentially not transmitted directly to the fuselage openings traversed by the engine support structure, but pass through the effort transmission connecting rods before reaching the fuselage. This passage through the connecting rods allows a very effective filtration/dampening of the vibrations. This leads to improved comfort for the occupants of the aircraft.

The limitation of the amplitude of the allowed oscillating movement, during which the assembly does not apply a load directly to the fuselage openings which it traverses, is determined by the requirements. As a preferred example, it is arranged such that, under normal flight conditions, the vibrating assembly oscillates without ever reaching the two extreme positions of the limited amplitude movement, and these positions are then reached only when high static loads are applied, for example those which may be found during turbulence. In the latter case, efforts can be transmitted directly by the vibrating assembly to the fuselage openings.

Moreover, the connecting rods transmit the efforts in the aircraft's transverse and vertical directions. This advantageously allows the intensity of the efforts transmitted directly by the support structure to the fuselage openings' frames to be minimised, or eliminated completely, allowing these frames to be of smaller dimensions than hitherto. Indeed, under normal flight conditions, preferably all the vertical and transverse efforts pass through the connecting rods specific to the present invention, introducing these efforts at points of the fuselage distant from the openings. The concentration of stresses within these fuselage openings' frames is thus appreciably minimised.

Furthermore, in order to minimise the concentration of stresses within the engine support structure, at right angles to the fuselage openings, it is preferentially arranged such that the first connecting rod end is also assembled on this support structure, at some distance from the openings. The structure, which is subject to less local stress, can thus be of smaller dimensions at right angles to the openings, leading to a non-negligible mass saving.

According to a preferred embodiment, the said effort transmission connecting rods are parallel, and the said oscillating movement is a circular translation.

According to another preferred embodiment, the said effort transmission connecting rods are inclined relative to one another as seen from a front view of the said rear part of an aircraft, so as to converge at a convergence point. If the structure reaches the stop on the fuselage at the furthest ends of the oscillating movement this enables efforts to be introduced into the fuselage closer to the latter's tangential direction, which enables the necessary structural strengtheners to be minimised, whilst allowing the oscillating movement.

In this embodiment the said effort transmission connecting rods are each inclined at an angle of less than 30° relative to the aircraft's vertical direction. The low inclination enables an oscillation movement to be obtained which is close to a circular translation, for which the traction and compression loading of the connecting rods is advantageously very low, thereby ensuring improved filtering of the vibrations.

In this configuration the assembly is subject to a movement comparable to a rotational movement, the centre of rotation of which moves during the movement, with the displacement of the centre of rotation being imposed by the angle of convergence selected between the two connecting rods.

It should be noted that the position of the point of convergence is also oscillating during the assembly's pendulum movement. The convergence of the direction of the connecting rods can be adjusted, at once to adjust the inherent frequency of the oscillator formed by the connecting rods, to adjust the necessary operating clearances, to limit the amplitude of the vertical vibratory component, to limit the stress in the connecting rods and their support elements, and finally to adjust the return efforts for improved stability of the system.

The said effort transmission connecting rods preferably provide the suspension from the said fuselage of the assembly formed by the support structure and the said engines. Thus, each effort transmission connecting rod is mounted above the said support structure, although a reverse situation could be envisaged. In the case of the suspension, the oscillation movement is comparable to a swinging of the assembly suspended from the fuselage by the connecting rods.

The limitation of the amplitude of the said oscillating movement is preferably such that it allows, in the aircraft's transverse direction, only a movement less than 30 mm of the assembly formed by the support structure and the said engines between its two extreme positions in this same transverse direction. Naturally, as is clear from the foregoing, during the oscillation movement which occurs in a transverse plane of the aircraft, the assembly can move simultaneously in the vertical direction relative to the fuselage. In this case it is preferentially arranged that the movement in the transverse direction is greater than the movement in the vertical direction, and a ratio higher than 2 between these movements can be chosen.

In a first preferred embodiment, the limitation of the amplitude of the said oscillating movement is provided by a system of stops assembled on the support structure and the fuselage. Thus, the system of stops remains inactive while the vibrating assembly does not reach one of the two extreme positions of its oscillating movement of limited amplitude, and becomes active when it reaches one of these two positions.

As mentioned above, the rear part of an aircraft is preferably designed such that in every position of the assembly formed by the support structure and the said engines, between the two extreme positions of its oscillating movement of limited amplitude, no effort is transmitted directly to the fuselage openings by the said assembly.

According to a second preferred embodiment, means of limiting the amplitude of oscillation of the assembly are provided, taking the form of a structure extending in a given direction between a connecting means on the oscillating assembly and an opposite connecting means on the fuselage, where the said structure is elastically deformable in the said given direction, and has increased deformation resistance above a predetermined elongation/retraction level in the said given direction.

Thus, it is preferentially arranged that the deformation resistance is very low while the predetermined elongation/retraction level of the structure has not been reached. As a consequence, the assembly can oscillate quite freely through the fuselage openings, since the structure limiting the amplitude of oscillation remains almost inactive. This oscillation allows very effective filtration/dampening of the vibrations, as mentioned above.

Conversely, when the predetermined elongation/retraction level of the structure is reached, the deformation resistance preferably becomes extremely substantial, i.e. sufficiently great to stop the assembly's oscillating movement. The amplitude of the latter is therefore limited. This case corresponds to the one in which high loads are applied, such as static loads, for example those likely to be found during turbulence.

In other words, the structure limiting the amplitude of oscillation remains inactive while the vibrating assembly does not reach one of the two extreme positions of its oscillating movement of limited amplitude, and becomes active when it reaches one of these two positions. The design is accordingly made such that the instant when the vibrating assembly reaches one of these two extreme positions coincides with the instant when the predetermined elongation/retraction level of the structure is reached, i.e. when the deformation resistance becomes sufficiently high to stop the amplitude of the oscillation.

Finally, it is noted that in this second preferred embodiment the rear part of an aircraft is designed such that in all positions of the assembly formed by the support structure and the said engines, i.e. in one of the two extreme positions of its limited amplitude oscillating movement, or in any intermediate position between these latter, no effort is transmitted directly to the fuselage openings by the said assembly.

This may involve a structure forming a connecting rod which is elastically deformable, or again a simple jack in which the predetermined elongation and retraction levels correspond respectively to the travel stops of the piston in the cylinder of the jack.

The said support structure preferably roughly forms a V-shape.

The said support structure is preferably constructed from first and second half-structures traversing respectively the said first and second openings of the fuselage, where the said first and second half-structures are joined to one another such that they can be disassembled with ease within the said internal space.

Thus, this greatly enables assembly and disassembly operations of the engine support structure to be facilitated, since this structure is now produced from two separate half-structures, joined to one another in reversible fashion. Each of these two half-structures can thus be handled independently of the other during assembly/disassembly, making the work easier for the operators. In particular, each support half-structure thus requires that only a single fuselage opening is traversed, advantageously implying a notable simplification for the operators, both on initial assembly and when the support structure is to be replaced.

In addition, during an assembly operation, the engine can be fitted at the end of each half-structure, before the half-structure is inserted in its corresponding fuselage opening, and before then being connected to the other half-structure. This simplifies still further the assembly method compared with the one used hitherto with the single structure solution, since with the latter the engines could be mounted on this structure only after this structure had been put in position on the fuselage.

The latter advantage is also naturally observed during an operation to disassemble the engine support structure, bearing in mind that each engine can be removed whilst remaining attached to its associated support half-structure.

Finally, another advantage arising from the construction as two half-structures lies in the possibility of inclining them relative to one another, as seen from a front view, in particular such that they form a V-shape.

However, a traversing support structure, produced as a single part and traversing both fuselage openings, can be envisaged without going beyond the scope of the invention.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PARTICULAR EMBODIMENTS

Figure 1:
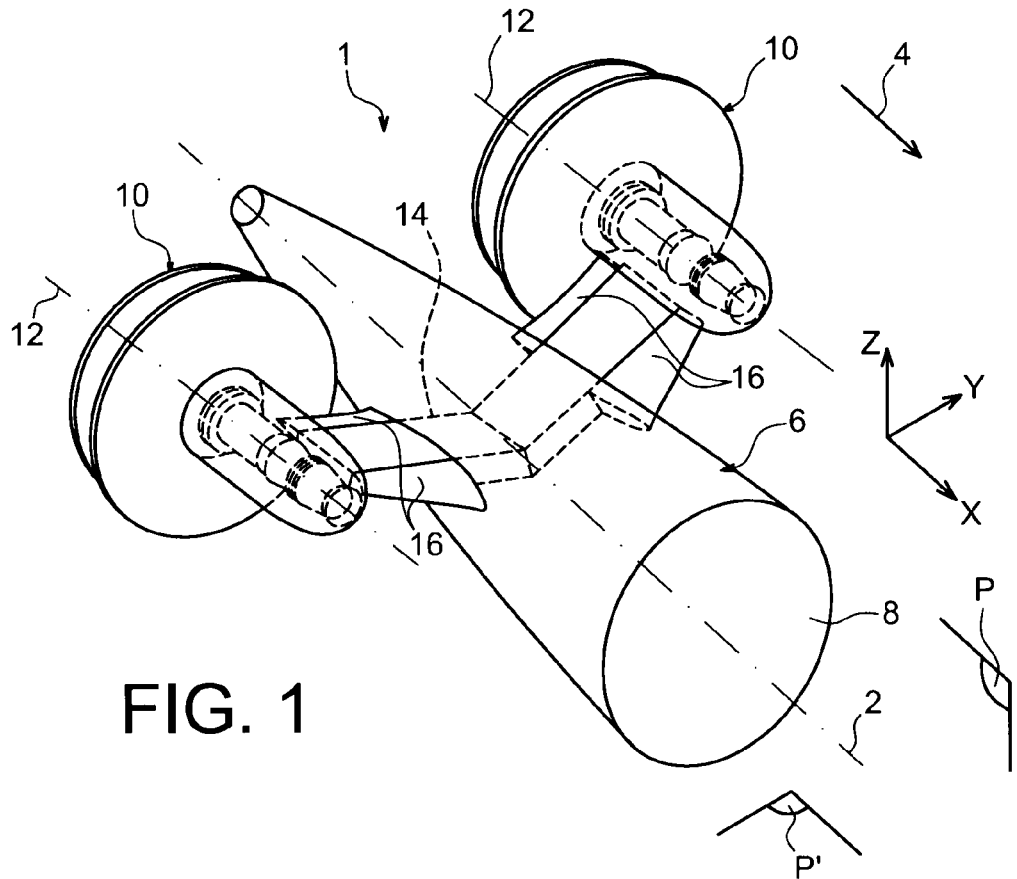
FIG. 1 represents a schematic perspective view of a rear part of an aircraft, according to a preferred embodiment of the present invention.

With reference to FIG. 1, a rear part 1 of an aircraft can be seen having the form of a preferred embodiment of the present invention.

Throughout the following description, by convention, the longitudinal direction of the aircraft which is parallel to a longitudinal axis of this aircraft is called X. In addition, the direction aligned transversely relative to the aircraft is called Y, and the vertical direction or direction of the height is called Z, and these three directions X, Y and Z are mutually orthogonal.

In addition, the terms "front" and "rear" must be considered relative to the forward direction of the aircraft imparted due to the thrust exerted by the engines, and this direction is represented schematically by the arrow 4.

Globally, rear part 1 includes a fuselage 6, of roughly circular, elliptical or similar section, having a centre passing through the longitudinal axis 2, and defining an internal space of the aircraft 8.

In addition, it includes at least two engines 10 positioned either side of a vertical median plane P passing through axis 2. In the preferred embodiment there are two engines 10, one either side of the fuselage 6, and these engines can be equally of the turbojet, turboprop engine type, or other type. Each has a longitudinal axis 12 which is roughly parallel to direction X.

To provide the suspension of these engines, there is a support structure 14, preferably positioned in a transverse plane, and which has the feature that it traverses the internal space 8 and the fuselage in the area of the two openings of the latter. The portions of this structure 14 which are laterally distant from the plane P, and which protrude externally from the fuselage, are encased with aerodynamic fairings 16, as can be seen in FIG. 1.

Figure 2:
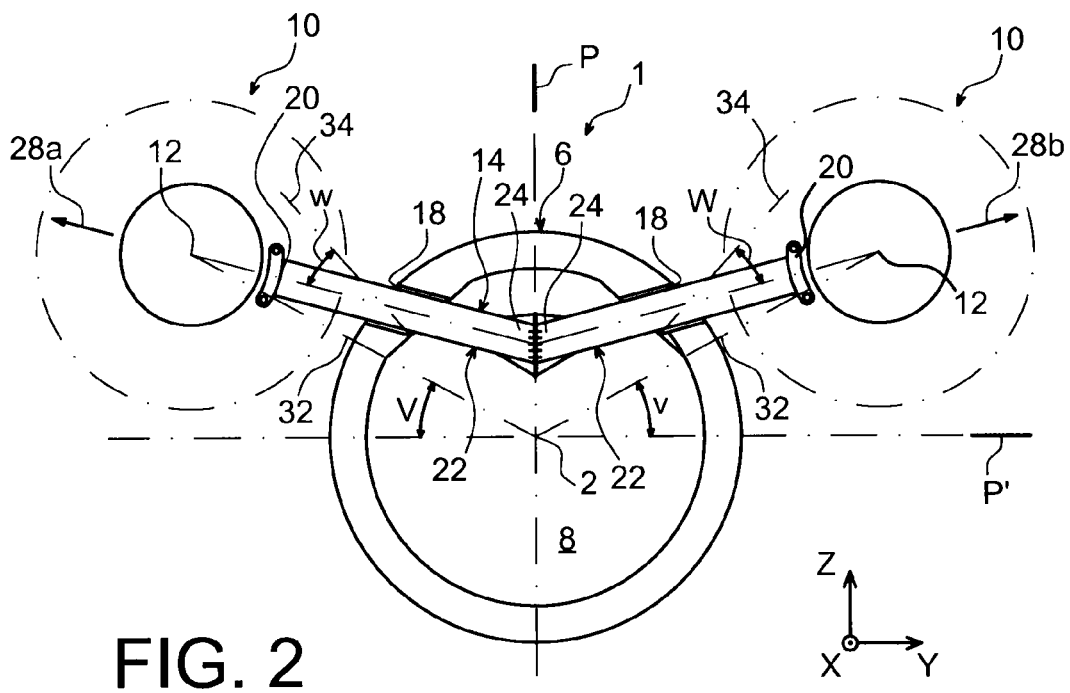
FIG. 2 represents a more detailed transverse section view of the rear part of an aircraft shown in FIG. 1, where the fastening means of the engine support structure on the fuselage have deliberately been omitted.

More specifically, with reference to FIG. 2, it can be seen that the support structure 14 traverses the fuselage 6 in the area of first and second openings made in the latter, both referenced 18. These two openings 18 are distributed either side of the vertical median plane P, and positioned symmetrically relative to the latter, which also roughly constitutes a plane of symmetry for the whole rear part of the aircraft.

The support structure 14 has opposite first and second ends, both referenced 20, and both of which protrude externally from the fuselage, respectively either side of plane P, and supporting one of the engines 10.

Each end 20 can thus the likened to a rigid engine mounting structure 4, for example of design identical or similar to those known in the prior art and which suspend an engine under a wing surface, and thus which thus transfers the engine efforts to the aircraft's structure.

In this preferred embodiment the support structure 14 of the engines is constructed from first and second half-structures, both referenced 22, and respectively traversing the first and second openings of the fuselage 18.

In addition, they are joined to one another other such that they can be disassembled with ease within the internal space 8. To accomplish this, the first half-structure 22 has an internal end 24 opposite the first end 20, and the second half-structure 22 has another internal end 24 opposite the second end 20, both internal ends 24 thus being in contact, and joined to one another such that they can be disassembled with ease within the internal space 8, using, for example, shearing pins and/or slugs (not represented).

The two half-structures 22 are preferably joined in the area of the plane P containing the attachment interface, and the pins and/or slugs are consequently traversed by plane P. Generally, this plane P constitutes a plane of symmetry for the engine support structure 14 which, as seen from a front view such as that shown in FIG. 2, roughly forms a V.

Indeed, the first half-structure 22, considered to be the one on the left-hand side in this FIG. 2, is inclined relative to direction Y, separating from plane P the higher it goes, just as the second half-structure 22, considered to be the one on the right-hand side in this FIG. 2, is also inclined relative to direction Y, separating from plane P the higher it goes. The first half-structure 22 therefore extends in a first direction 28a inclined relative to directions Y and Z in a transverse plane, whereas the second half-structure 22 extends in a second direction 28b which is also inclined relative to directions Y and Z in the same transverse plane.

Each half-structure 22 has the shape of a beam or box extending in roughly rectilinear fashion in its associated direction 28a, 28b, from its internal and 24 positioned in plane P, as far as its opposite end 20 supporting one of the engines 10.

In the preferred embodiment the V-shape formed by the structure 14 opens at the top, and its point is positioned above longitudinal axis 2. The freedom of positioning of the point of the V, and the freedom of determination of the value of the angle of this V-shape, allow optimum adaptation to the various existing stresses, and in particular allow the aerodynamic disturbances found in the external portions of the half-structures 22 to be limited as far as possible.

Indeed, the support structure is designed such that, as seen from a front view, for each half-structure:
- an acute angle (v) between a horizontal median plane of the fuselage P', and a straight line 32 connecting axis 2 of the fuselage and longitudinal axis 12 of the engine, is greater than 25°; and
- an acute angle (w) between the direction 28a, 28b in which the said half-structure extends, and the direction 34 normal to the fuselage in the area of the passage of this half-structure, is less than 20°.

This relatively high value of the angle (v) enables the engines to be positioned at the desired height relative to the fuselage with, for example, the engine axes 12 positioned in a horizontal plane close to an upper end of the fuselage, whereas the relatively low value of the angle (w), reflecting a separation between the fuselage and each half-structure, enables use of an additional aerodynamic fairing to be avoided.

Figure 2A:
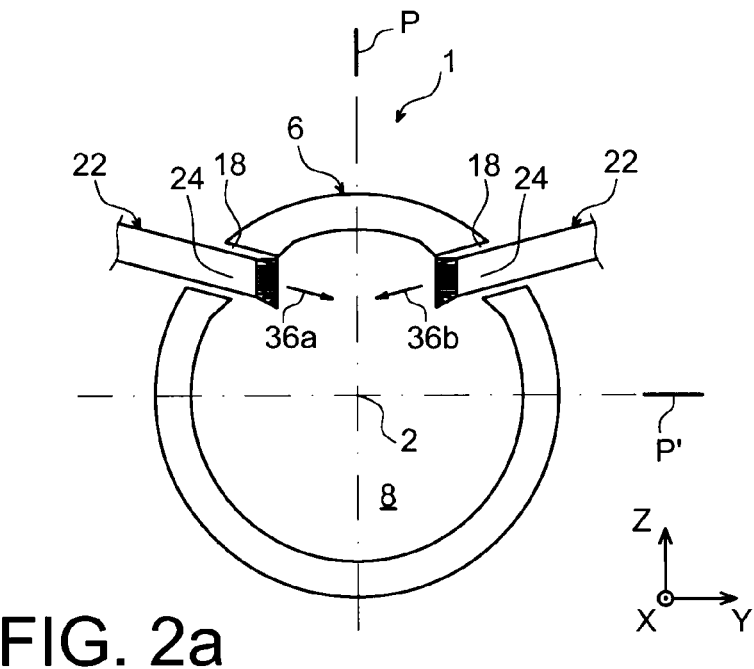
FIG. 2a shows diagrammatically the method of assembly of the rear part shown in the previous figures.

The design described above allows easy assembly and disassembly of the support structure 14. Indeed, with reference to FIG. 2a showing diagrammatically a method for assembly of the rear part of an aircraft 1, it can be seen that this method includes the step of positioning of the first half-structure 22, by moving the latter, with the aim of having it pass through the first fuselage opening 18 with its internal end 24 in a forward position in the direction of movement 36a, corresponding, for example, to the first direction 28a in which this first half-structure extends once installed.

Simultaneously or successively, a step of positioning of the second half-structure 22 is implemented, by moving the latter, with the aim of having it pass through the second fuselage opening 18 with its internal end 24 in a forward position in the direction of movement 36b, corresponding, for example, to the second direction 28b in which this second half-structure extends once installed.

During each of these two steps the engine 10 may already be installed on the external end 20 (not represented in FIG. 2a), in order to simplify and shorten the assembly method.

In addition, it is arranged such that the internal ends 24 are dimensioned in order to pass through their respective fuselage openings 18, preferably even being fitted with their reinforcement means dedicated to the assembly of the two half-structures, such as ribs or similar elements. Alternatively, these reinforcement means can be assembled on the internal ends 24 only after the latter have passed through the openings 18, 18.

It is generally arranged such that in a median opening plane the ratio between the height of the opening and the height of a half-structure is between 1.3 and 2. Moreover, in this same plane, the ratio between the depth of the opening and the depth of a half-structure, in direction X, is between 1.1 and 1.5.

After this, the internal end 24 of the first half-structure 22 is joined to the internal end of the second half-structure 22, using the abovementioned joints and fastenings, which are preferably oriented in direction Y.

Figure 3:
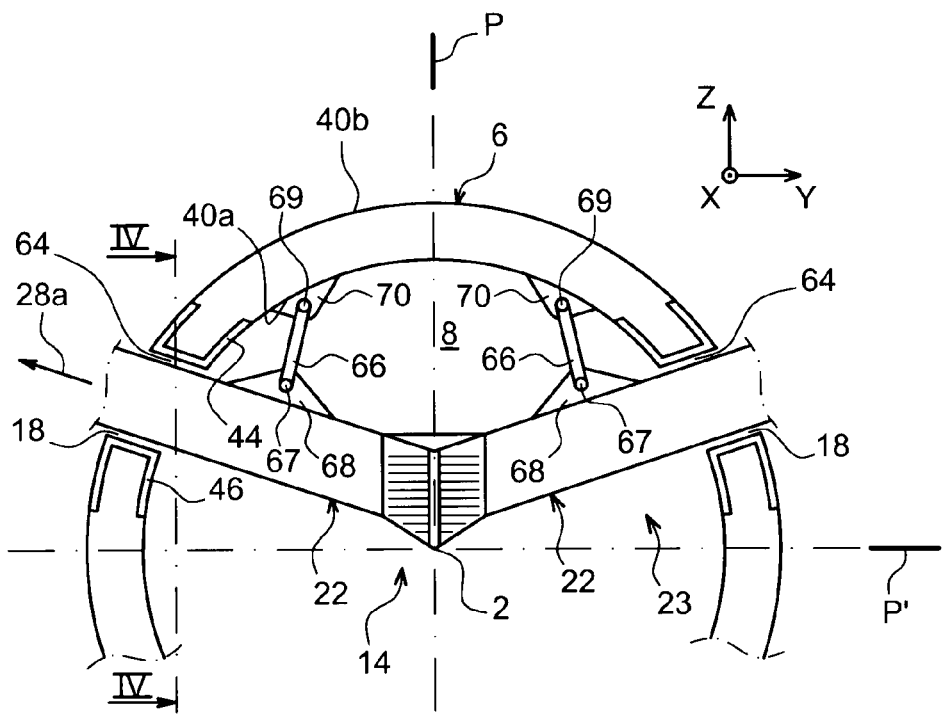
FIG. 3 represents a view similar to that of FIG. 2, in which the fastening means of the engine support structure on the fuselage have been partially represented.
Figure 4:
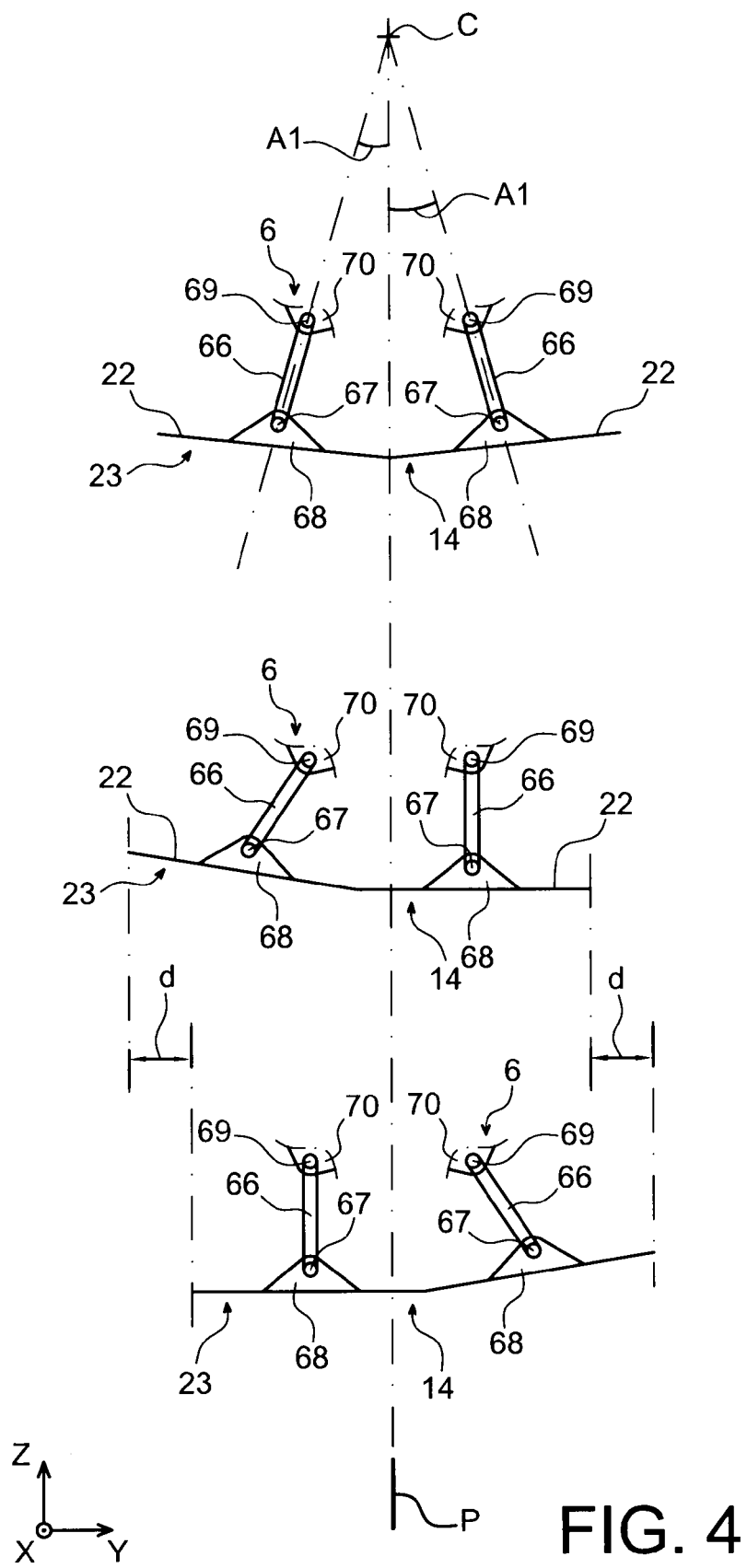
FIG. 4 represents the vibrating assembly schematically in various positions, when it is moving with its limited amplitude oscillating movement.

There are also fastening means between the fuselage and the engine support structure. More specifically, these fastening means connect the fuselage 6 to the connected assembly formed by the structure 14 and the engines 10, this assembly referenced 23 being called the vibrating assembly. A first form of embodiment is shown in FIGS. 3 and 4.

These fastening means includes two effort transmission connecting rods 66, specific to the present invention. This enables the intensity of the efforts passing through the opening frames 50 to be minimised, enabling the latter to be of smaller dimensions than those found hitherto. Above all, these connecting rods enable the vibrations transmitted to the fuselage by the vibrating assembly 23 to be greatly reduced, as will be described in detail below.

In the represented embodiment there are two identical connecting rods 66, positioned symmetrically relative to plane P as seen from a front view of the aircraft, these two connecting rods being preferentially positioned in the same transverse plane of the front part of the aircraft.

Each of these connecting rods has a first end, or lower end, mounted on the support half-structure 22, in rotary fashion with an axis of rotation 67 parallel to direction X. Each also has a second end opposite to the first, called the upper end, mounted on the fuselage at some distance from the openings 18, also in rotary fashion with an axis of rotation 69 parallel to direction X.

To minimise the concentration of stresses within the support half-structure 22, at right angles to opening 18, it is preferentially arranged such that the first connecting rod end is also mounted on this support structure at some distance from the openings, preferably therefore within the internal space 8.

Each first connecting rod end is assembled in rotary fashion on its half-structure 22, for example using a bracket 68 connected to the latter, just as each second connecting rod end is assembled in rotary fashion on the upper part of the fuselage, for example using a bracket 70 connected to this upper part.

In this case both connecting rods extend upwards, approaching the median vertical plane P, together roughly forming an inverted V-shape relative to that of the support structure 14. The inclination of each of the connecting rods 66, as seen from a front view as in FIGS. 3 and 4, is such that angle A1 between the longitudinal axis of the connecting rod and the vertical direction Z is less than 30°. It should be noted, as is shown in FIG. 4, that in the neutral idle position of assembly 23 the longitudinal axes of the connecting rods 66 converge towards a point of convergence C located at some distance from the connecting rods, in plane of symmetry P.

The connecting rods 66 transmit the efforts in the aircraft's transverse and vertical directions. But above all, in flight, they allow free oscillation of assembly 13 relative to the fuselage 6, with limited amplitude. These vibrations of assembly 23 thus lead to such an oscillating movement, during which these vibrations are not transmitted directly to the fuselage openings traversed by the engine support structure, but pass through the connecting rods before reaching the fuselage. This transmission through the connecting rods 66 allows the vibrations to be filtered/dampened very satisfactorily.

In FIG. 4, the top representation shows the assembly 23 in its neutral idle position, which it adopts in particular on the ground when the aircraft is stopped and the engines turned off. In this idle position, the symmetry of the connecting rods and of the assembly 23 relative to plane P is perfect. Conversely, as soon as the engines are operating, assembly 23 vibrates, which causes it to oscillate freely between the two extreme positions shown respectively in the middle representation and the lower representation of FIG. 4.

The oscillating movement of the assembly 23 relative to the fuselage 6 is therefore allowed by the rotation of both connecting rods around each of the axes of rotation 67, 69. Naturally, the way the support structure passes through the fuselage openings is such that it allows this free oscillation of the assembly 23.

The limitation of the amplitude of the oscillating movement is determined by the requirements. It is preferably arranged such that, under normal flight conditions, the vibrating assembly 23 oscillates without ever reaching the two extreme positions of the limited amplitude movement shown in FIG. 4, and these positions are then reached only when high loads are applied, such as static loads, for example those which may be found during turbulence.

This is reflected, for example, in the fact that in direction Y the permitted movement "d" between the two extreme positions is less than 30 mm.

It should be noted that the position and orientation of the connecting rods could be modified in accordance with the requirements. With this regard, the connecting rods could be positioned beneath structure 14, and not above it, as is so with the suspension of the vibrating assembly 23.

Figure 5A:
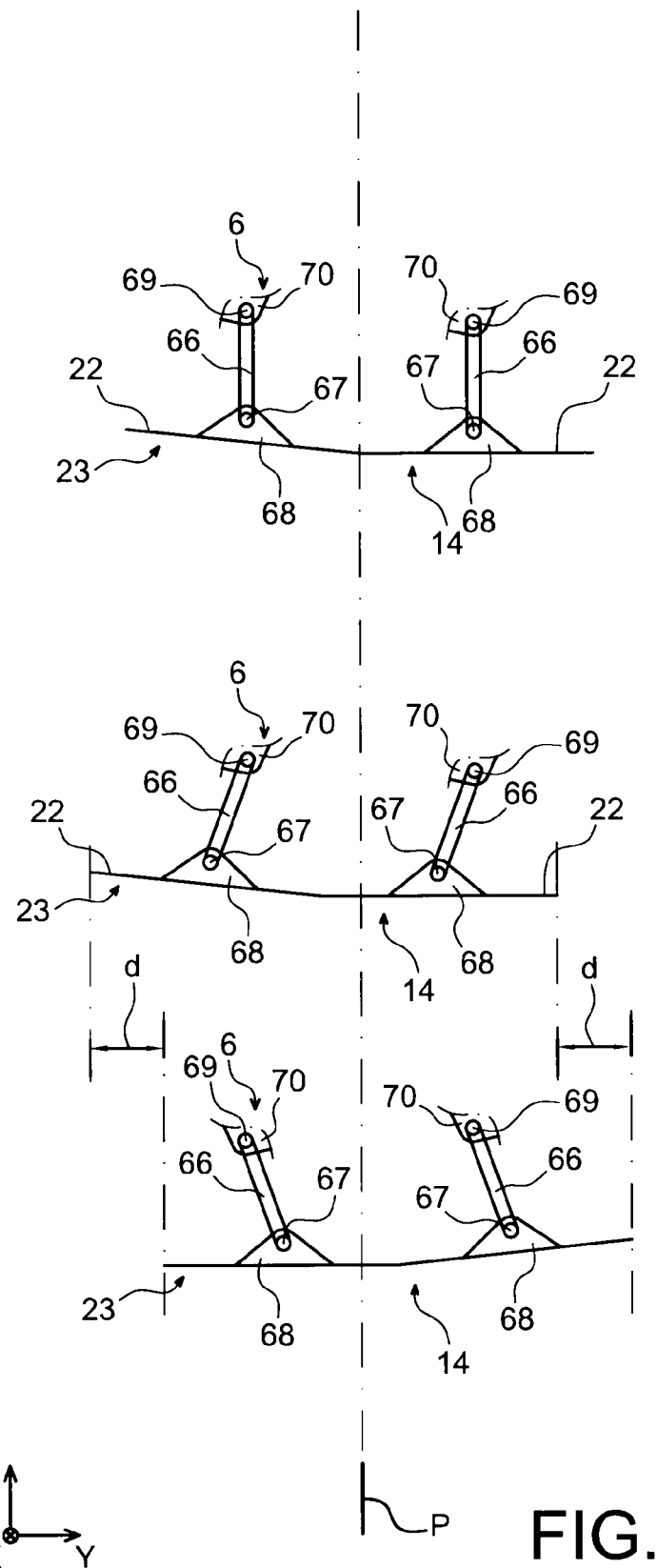
FIG. 5a represents a similar view to that of FIG. 4, in which the rear part takes the form of another preferred embodiment of the present invention.

Another preferred embodiment consists, for example, in having both connecting rods 66 parallel to one another, as is seen in FIG. 5a. In this case, the oscillating movement of assembly 23 is a circular translation, since the fuselage 6, the connecting rods and the assembly 23 constitute a deformable parallelogram.

Figure 5B:
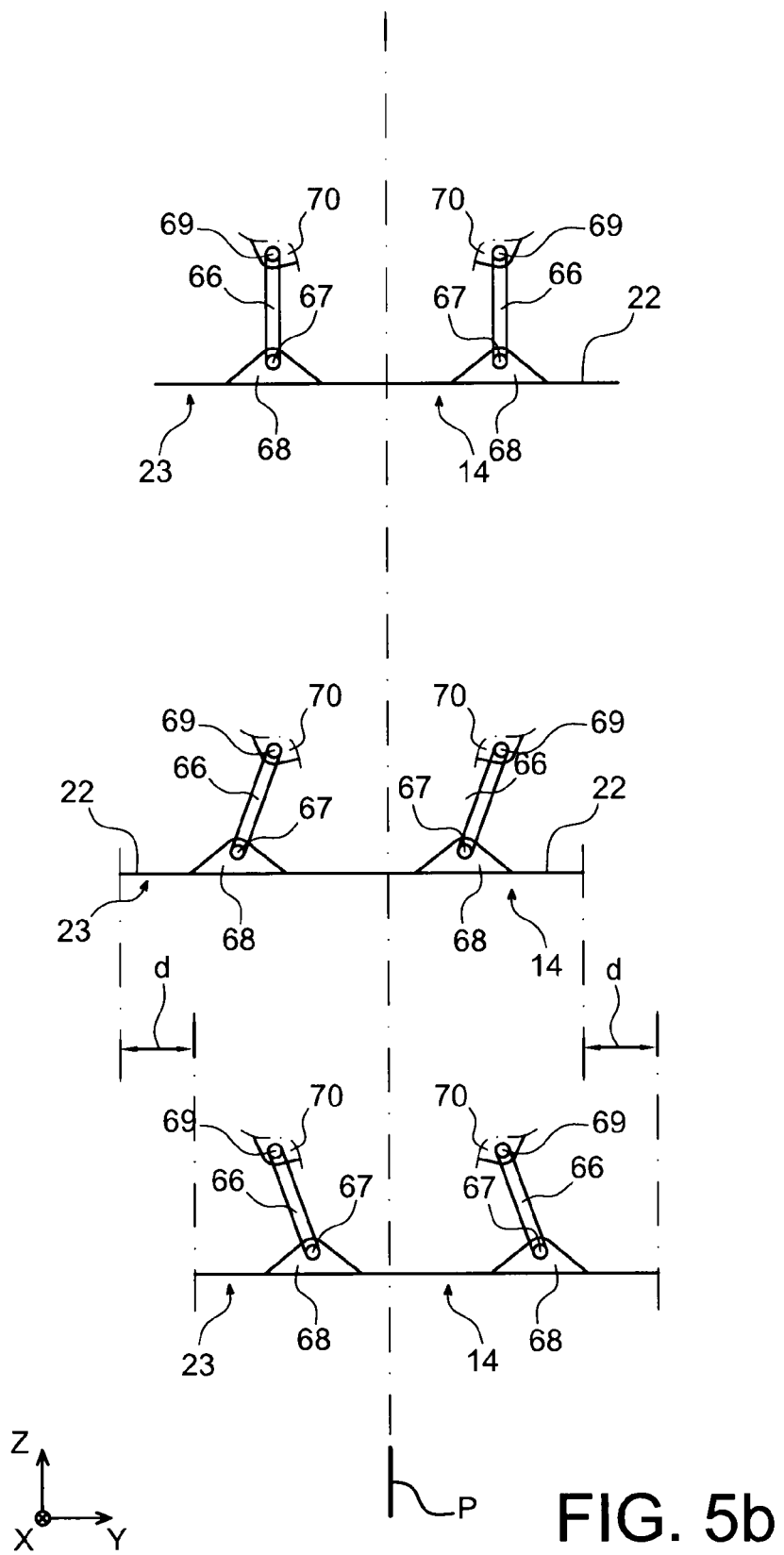
FIG. 5b represents a similar view to those of FIGS. 4 and 5a, in which the rear part takes the form of another preferred embodiment of the present invention.

Another preferred embodiment consists in designing the engine support structure 14 such that it is no longer constructed as two half-structures connected to one another, but as a single structure, preferably rectilinear and transverse, and passing through both fuselage openings. It should be noted that this type of structure, shown diagrammatically in FIG. 5b, may be used whatever position is chosen for the connecting rods.

It should also be noted that in the case of the preferred embodiments described above only one pair of symmetrical connecting rods has been presented. However, the number of connecting rods may be greater than two: for example, it may be completed by another pair of connecting rods shifted relative to the first pair in direction X, and also positioned so as to allow the oscillating movement described above.

Figure 6:
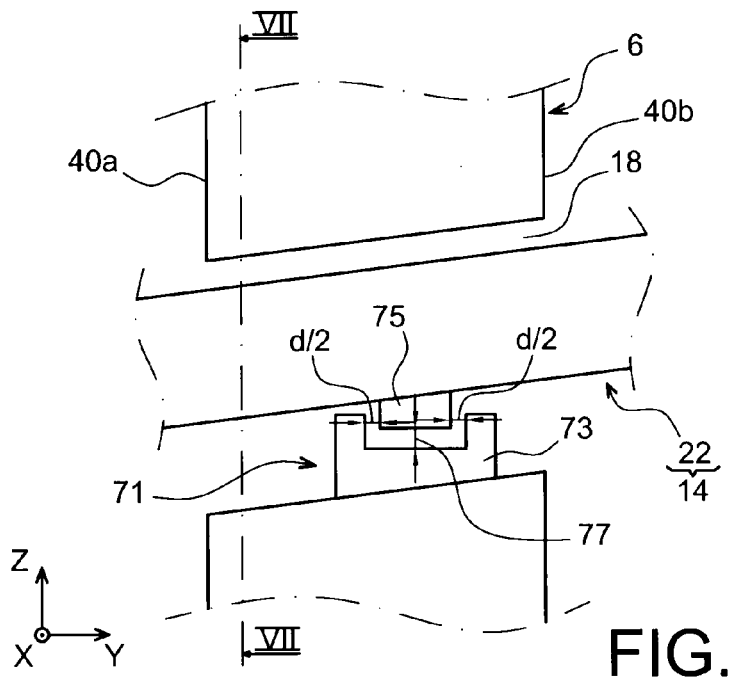
FIG. 6 is a view showing an example embodiment of a system of stops limiting the amplitude of the oscillating movement of the vibrating assembly.

With reference at present to FIG. 6, an example embodiment of a system of stops is represented enabling the limitation of the amplitude of the oscillating movement represented in FIG. 4 to be obtained.

This stop system, referenced 71, is preferentially housed in opening 18. Moreover, a comparable stop system is also preferably installed in the other opening 18 of the fuselage. It includes a first stop 73 connected to the frame defining the opening 18, cooperating with a second stop 75 connected to the half-structure 22. The first stop 73 may have the shape of an orifice demarcated by two facing sides, an orifice in which the second lug-shaped stop 75 is housed. The clearances between the stops 73, 75 are such that they allow free oscillation of the vibrating assembly. This being so, it can be arranged such that in the neutral position of the assembly shown in FIG. 6 the clearances between the lug and the two sides of stop 73, in direction Y, are equal to "d/2". There is another clearance 77 between the stops in the vertical direction, to cater for the movement in this same direction of the vibrating assembly during its oscillation movement.

Thus, while the vibrations of the assembly remain at an acceptable level the system of stops 71 remains inactive, and the assembly oscillates freely. Conversely, it becomes active beyond this level, leading to a direct transmission of efforts from the support structure 14 to the frame forming the opening 18, through the stops 73, 75, when these come into contact with one another.

Figure 7:
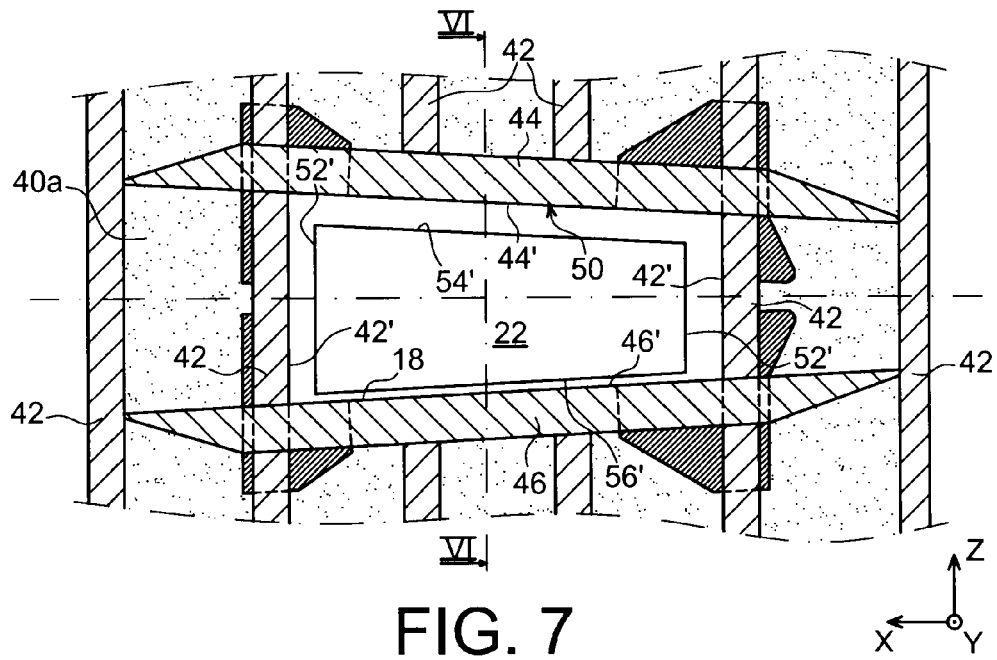
FIG. 7 represents a section view with the vertical line VII-VII of FIG. 6.

With reference to FIG. 7, it should be noted that the opening 18, of design identical or similar to that of the other fuselage opening, is constructed by means of an opening in the internal fuselage skin 40a, and another facing opening, in the external fuselage skin 40b (visible in FIG. 6). These two openings respectively form the entrance of opening 18 and the exit of this same opening.

The opening is demarcated towards the front by a front fuselage frame 42, and towards the rear by another rear fuselage frame 42. As can be seen in FIG. 7, other fuselage frames 42 located between the two abovementioned ones, can be cut into sections for the purpose of showing opening 18. In addition, the opening is demarcated in its upper part by an upper closing crosspiece 44, which preferably extends in direction X across the entire width of the fuselage, and which connects the two front and rear fuselage frames 42, 42. In the same way, opening 18 is demarcated in its lower part by a lower closing crosspiece 46, which preferably extends in direction X across the entire width of the fuselage, and which connects the two front and rear fuselage frames 42, 42. The four elements 42, 42, 44, 46 together form the first frame 50 defining opening 18.

Thus, in the vertical plane defined by line VII-VII of FIG. 6, and in the median opening plane, which is comparable to the plane orthogonal to the half-structure 22, and traversing the opening roughly in its middle between its entrance and its exit, frame 50 has the shape of a quadrilateral due to its four faces 42', 42', 44', 46', respectively defined by the abovementioned elements 42, 42, 44, 46. In these same planes, the four faces of the half-structure 22 also form a quadrilateral, the faces of the half-structure and of the opening forming two facing pairs. Consequently, the front face 52' of the half-structure is facing the front face 42' of the frame, the rear face 52' of the half-structure is facing the rear face 42' of the frame, the upper face 54' of the half-structure is facing the upper face 44' of the frame, and the lower face 56' of the half-structure is facing the lower face 46' of the frame.

The separation between these faces does indeed allow free oscillation of the vibrating assembly through the fuselage openings since, preferably, the only thing between each opening frame and the engine support structure is the stop system. According to one alternative it is possible to install means for transmission of the longitudinal efforts in each fuselage opening. In such a case these means are naturally designed so as not to disrupt the oscillatory movement of the assembly in the transverse plane. However, another solution may consist in installing these means of transmission of the longitudinal efforts outside the fuselage openings.

Figure 8:
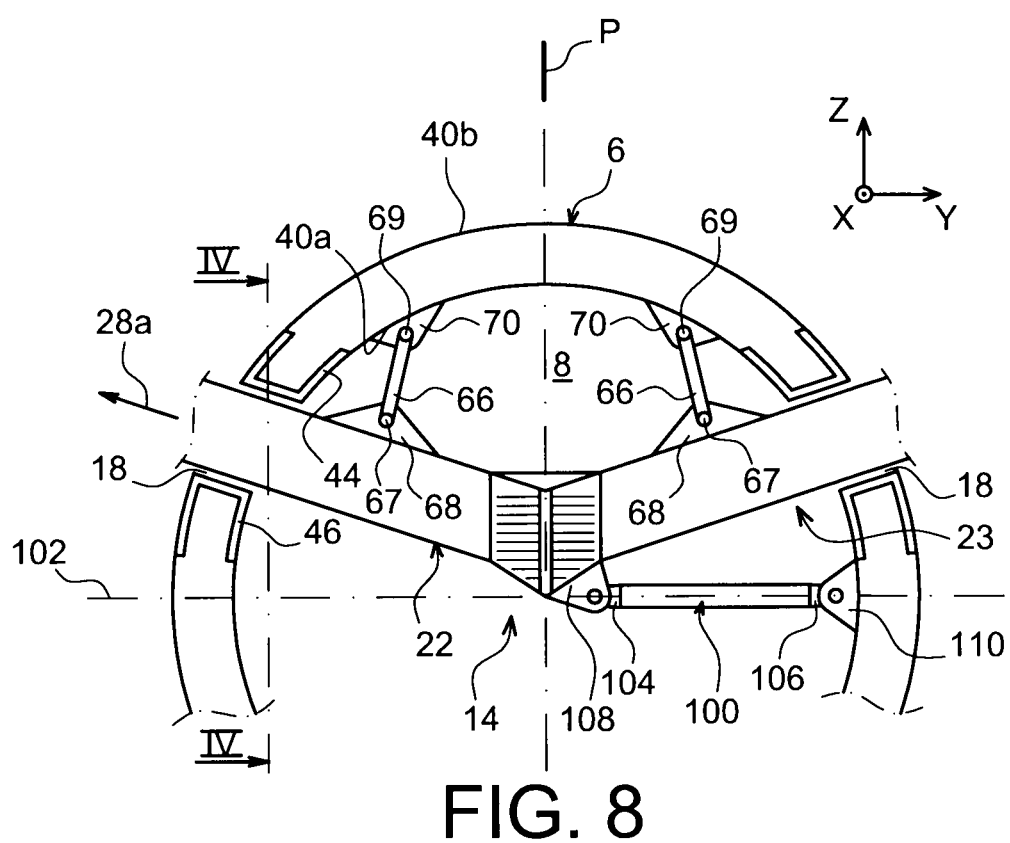
FIG. 8 represents a view similar to that of FIG. 3, in which an example embodiment of a structure limiting the amplitude of oscillation of the assembly formed by the support structure and the engines is shown.

FIG. 8 shows another preferred embodiment, in which the system of stops 71 is replaced or designed in combination with means to limit the amplitude of oscillation of the assembly, taking the form of a structure 100 extending in a given direction 102 between a connecting means 104 on the oscillating assembly 23, and an opposite connecting means 106 on the fuselage 6. In the represented example the given direction 102 is transverse, and means 104, 106 are connected in rotary fashion to their respective associated elements by brackets 108, 110. As it has been represented, bracket 108, which is used for the pivoting connection of means 104, is preferentially positioned on or close to the junction between the two half-structures 22, 22.

Structure 100 therefore extends roughly transversely, in the form of an elastically deformable connecting rod in its direction 102.

Figure 9A:
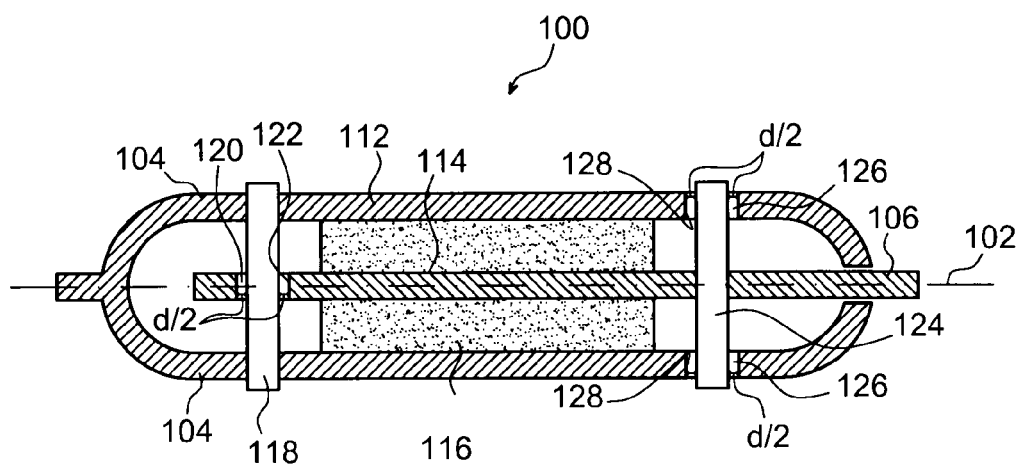
FIGS. 9a and 9b show in greater detail the structure limiting the amplitude of oscillation of FIG. 8, in two separate configurations.

As is shown by FIG. 9a, the structure 100 has a metal external hollow part 112 which supports the connecting means 104, and a metal internal part 114 which supports the connecting means 106, or vice versa. The hollow external part 112 and hollow internal part 114 are preferentially positioned concentrically. However, other solutions may be envisaged, such as solutions involving plates, or again solutions allowing the adhesion surface between the metal part and the layer made from elastomer or rubber material described below to be increased, for example using slot-shaped or star-shaped sections.

The internal part 114 is connected to the external part 112 by one or more layers made from elastomer or rubber material, referenced 116. This layer 116 may thus be of annular shape between the two parts 112, 114 which it connects, for example by being attached by means of adhesion to each of these parts.

In addition, a first metal shearing slug 118 is assembled securely on the external part 112 which it traverses, preferably transversely. Moreover, this first slug 118 traverses the internal part 114 with a clearance 120. In FIG. 9a the represented configuration corresponds to the case in which the oscillating assembly is in its neutral idle position, which it adopts in particular on the ground when the aircraft is stopped and the engines turned off. In this position, it is arranged such that in the given direction 102 of the structure 100, the slug 118 is located at a distance d/2 from each of the two ends of the orifice 122 of the internal part 114, due to the presence of the clearance 120.

In comparable fashion, a second metal shearing slug 124 is assembled securely on the internal part 114 which it traverses, preferably transversely. This second slug 124 also traverses the external part 112 with a clearance 126, preferably in the area of the two opposing portions of this part 112, as shown in FIG. 9a. Here too, it is arranged such that in the given direction 102 of the structure 100, the slug 124 is located at a distance d/2 from each of the two ends of the two orifices 128 of the external part 112, due to the presence of the clearances 126.

Under normal flight conditions the vibrating assembly oscillates. The structure 100 accompanies this oscillating movement, without disrupting it, becoming deformed in direction 102. This is made possible by the fact that the structure 100 has only low, or negligible, deformation resistance, since the transmission of efforts between the two means 104, 106 causes a shearing stress in the layer of elastomer material 116, and thus a relative movement of the internal part 114 relative to the external part 112, in direction 102. During this relative movement the clearances 120, 126 are partially consumed by the slugs 118, 124, respectively.

Consequently, under normal flight conditions, while the vibrating assembly oscillates without ever reaching the two extreme positions of the limited amplitude movement, the slugs 118, 124 move in their respective orifices 122, 128 without coming to a stop against the latter, due to the deformation of the layer of elastomer material 116, which is subject to shearing stress.

The extreme positions of the limited amplitude movement are then reached only when high static loads are applied, which may for example be found during turbulence. These positions are reached when the clearances 120, 126 are completely consumed by the slugs 118, 124, respectively. In this case, the structure 100 has a substantially greater deformation resistance, since the efforts pass through the shearing slugs 118, 124, and then apply traction/compression stresses to the two metal parts 112, 114.

In this configuration, the deformation resistance is sufficiently great to prevent the vibrating assembly from moving further through the fuselage openings, which remain, for their part, subject to no mechanical stress, due to the connection of the structure 100 at some distance from them.

Figure 9B:
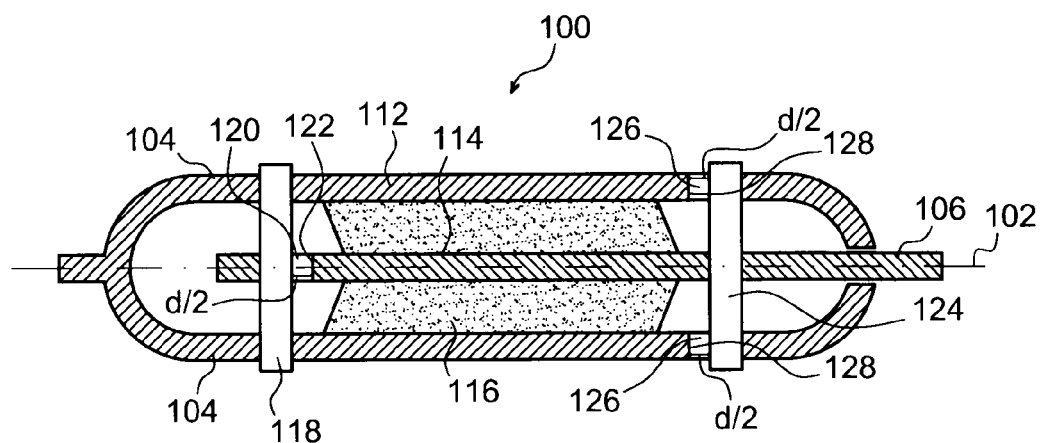

FIG. 9b represents one of the cases in which the predetermined elongation/retraction level of the elastically deformable structure 100 has been reached. This is the case of a traction stress in structure 100, which has reached its predetermined elongation level coinciding with the establishment of the very high deformation resistance, procured by the support of slugs 118, 124 in their associated orifices 122, 128. This position enables the leftward movement of the assembly 23 shown in FIG. 8 relative to the fuselage 6 to be limited.

Although it has not been represented, the structure 100 also allows, by compression, the rightward movement of the assembly 23 relative to the fuselage 6 to be limited.

In this case also, it is arranged such that the permitted movement "d" between the two extreme positions of the assembly 23 is less than 30 mm.

Naturally, various modifications can be made by the skilled man in the art to the invention which has just been described, solely as non-restrictive examples.

The invention claimed is:

1. A rear part of an aircraft comprising:
a fuselage defining an internal space of the aircraft;
at least two engines;
an engine support structure, traversing the fuselage in an area of first and second openings made in the fuselage, and distributed on either side of a vertical median plane of the aircraft, wherein the support structure includes first and second opposite ends, each of the first and second opposite ends of the support structure protruding externally from the fuselage, respectively on either side of the vertical median plane, and supporting one of the engines; and
fastening means connecting the support structure to the fuselage;
wherein the fastening means includes two effort transmission connecting rods positioned, as seen from a front view of the rear part of an aircraft, on either side of the vertical median plane, wherein each connecting rod includes a first end mounted on the support structure in rotary fashion along an axis of rotation parallel to the longitudinal direction of the aircraft, and a second end mounted on the fuselage, at a distance from the first and second openings, in a rotary fashion along an axis of rotation parallel to the longitudinal direction of the aircraft,
wherein the rear part of an aircraft is configured so as to allow, by rotation of the connecting rods around the axes of rotation, an oscillating movement of limited amplitude of the assembly formed by the support structure and the engines, relative to the fuselage, through the first and second openings of the fuselage.

2. A rear part of an aircraft according to claim 1, wherein the effort transmission connecting rods are parallel, and the oscillating movement is a circular translation.

3. A rear part of an aircraft according to claim 1, wherein the effort transmission connecting rods are inclined relative to one another as seen from a front view of the rear part of an aircraft, so as to converge at a convergence point.

4. A rear part of an aircraft according to claim 3, wherein the effort transmission connecting rods are each inclined by an angle of less than 30° relative to the aircraft's vertical direction.

5. A rear part of an aircraft according to claim 1, wherein the effort transmission connecting rods provide suspension from the fuselage of the assembly formed by the support structure and the engines.

6. A rear part of an aircraft according to claim 1, wherein a limitation of amplitude of the oscillating movement is such that it allows, in the transverse direction of the aircraft, only a movement less than 30 mm of the assembly formed by the support structure and the engines, between its two extreme positions in this same transverse direction.

7. A rear part of an aircraft according to claim 1, wherein a limitation of the oscillating movement is provided by a system of stops mounted on the support structure and the fuselage.

8. A rear part of an aircraft according to claim 1, further comprising means for limiting amplitude of oscillation of the assembly, including a structure extending in a given direction between a connecting means on the oscillating assembly and an opposite connecting means on the fuselage, wherein the structure is elastically deformable in the given direction, and has increased deformation resistance above a predetermined elongation/retraction level in the given direction.

9. A rear part of an aircraft according to claim 1, configured such that in any position of the assembly formed by the support structure and the engines, between two extreme positions of its oscillating movement of limited amplitude, no effort is transmitted directly to the fuselage openings by the assembly.

10. A rear part of an aircraft according to claim 1, wherein the support structure includes first and second half-structures traversing respectively the first and second openings of the fuselage, wherein the first and second half-structures are joined to one another such that they can be disassembled with ease within the internal space.

\* \* \* \* \*